(12) United States Patent
Kadoch

(10) Patent No.: US 8,902,296 B2
(45) Date of Patent: Dec. 2, 2014

(54) METHOD OF DISPLAYING AN IMAGE IN THREE DIMENSIONS AND PANEL THUS PRODUCED

(75) Inventor: Daniel Kadoch, La Varenne (FR)

(73) Assignee: Lirone, La Varenne (FR)

( * ) Notice: Subject to any disclaimer, the term of this patent is extended or adjusted under 35 U.S.C. 154(b) by 1379 days.

(21) Appl. No.: 12/310,527

(22) PCT Filed: Aug. 28, 2006

(86) PCT No.: PCT/FR2006/001998
§ 371 (c)(1),
(2), (4) Date: Jun. 14, 2010

(87) PCT Pub. No.: WO2008/025888
PCT Pub. Date: Mar. 6, 2008

(65) Prior Publication Data
US 2010/0265319 A1    Oct. 21, 2010

(51) Int. Cl.
*H04N 13/04*    (2006.01)
*G03B 35/24*    (2006.01)
*G03B 21/60*    (2014.01)
*G09F 15/00*    (2006.01)
*G02B 27/22*    (2006.01)

(52) U.S. Cl.
CPC ............ *G09F 15/0006* (2013.01); *G03B 35/24* (2013.01); *G03B 21/606* (2013.01); *G02B 27/2221* (2013.01); *G02B 27/2278* (2013.01)
USPC .............................................. 348/51; 348/46

(58) Field of Classification Search
CPC .... G06Q 30/0241; H04L 51/14; H04L 67/42; H04L 29/06; H04L 67/38; H04L 41/22; H04L 67/141; G06T 1/00; G06T 19/20
USPC ....................................................... 348/46, 51
See application file for complete search history.

(56) References Cited

U.S. PATENT DOCUMENTS

2005/0219693 A1 * 10/2005 Hartkop et al. ............... 359/462
2005/0275942 A1 * 12/2005 Hartkop et al. ............... 359/464
2007/0113443 A1 *  5/2007 Bregman ........................ 40/579

FOREIGN PATENT DOCUMENTS

EP    0 877 967    4/2005
FR    742 388      3/1933

* cited by examiner

*Primary Examiner* — Phuoc Nguyen
(74) *Attorney, Agent, or Firm* — Clark & Brody

(57) ABSTRACT

The invention seeks to make it possible to display an image in three dimensions without additional display means, and to furnish a device that is easy to implement and applicable to drawings and paintings. To that end, a purpose of the invention is a direct display panel of images in three dimensions that comprises a bottom panel (1) and at least one structural panel (2, 3) provided with at least one cut-out defining at least two strips (2a to 2b, 3b, 3d). The strips are attached above the bottom panel (1) by attachment means (5) so that at least a portion of strip (2a to 2g, 3b, 3d) of the structure panel is at a defined distance (d, d1, d2) from the panel (1, 2, 3) on which said strip is attached.

16 Claims, 3 Drawing Sheets

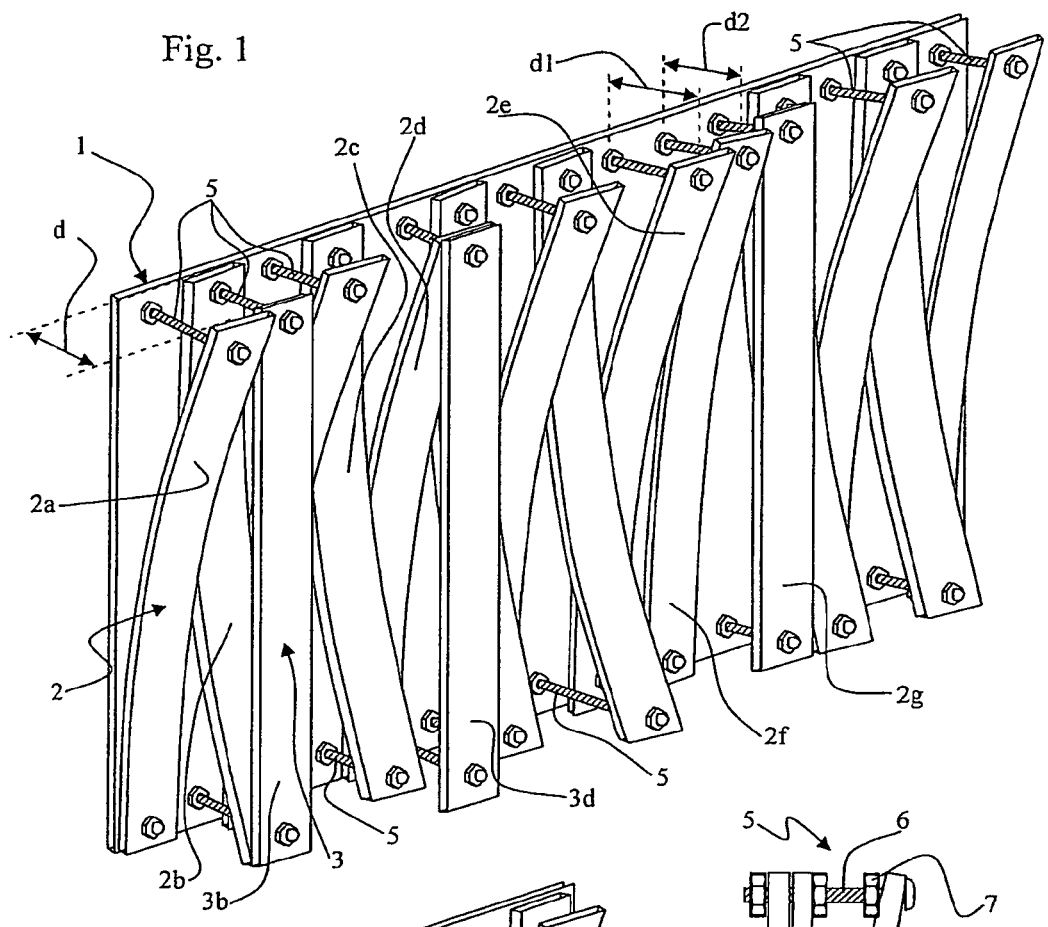
Fig. 1
Fig. 2
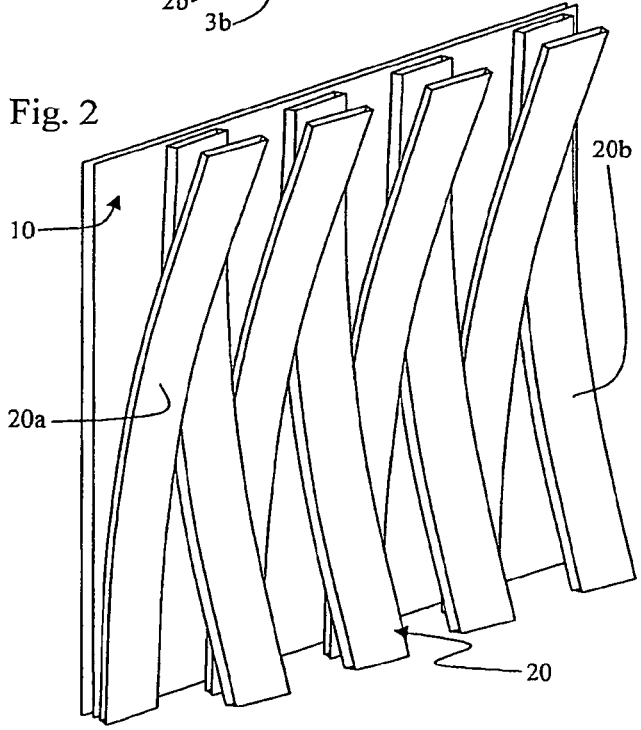
Fig. 3

METHOD OF DISPLAYING AN IMAGE IN THREE DIMENSIONS AND PANEL THUS PRODUCED

The invention relates to a method of directly viewing an image in three dimensions, and to a panel made for implementing the method.

Observing an image in two dimensions requires an effort of interpretation effort since the image is no more than a perspective projection of three-dimensional space onto a plane. The term "image" should be understood as including photographs, drawings, paintings, synthesized images, and images made by any other means.

Viewing an image by exercising an optical effect that creates the impression of relief procures a sensation of presence and of realism, since the spectator penetrates into the scene in three dimensions.

Several systems exist in the state of the art for giving the impression of volume to an image, and in particular stereoscopic techniques that consist essentially in showing two two-dimensional images of the same scene taken from two different angles or using two complementary wavelengths or two orthogonal planes of polarization, and then in viewing those images. Such viewing can be performed with the naked eye but at the cost of making a viewing effort—parallel viewing "at infinity" or cross-eyed viewing—, or else with the help of a stereoscopic appliance or viewing spectacles for the anaglyph method.

Another technique, involving an array of lines, consists in interleaving the two above-mentioned images by splitting them up into vertical strips and causing strips of the first image to alternate with strips of the second image. A mask is then placed in front of the overall reconstituted image, the mask having vertical strips that alternate between being opaque and transparent. The left eye sees the odd-numbered strips and thus the first image while the right eye sees the even-numbered strips, and thus the second image.

The main problem thus lies in the fact that all of those techniques require either a special viewing effort to be made, which some people find difficult, or else they require special image viewing means to be used—glasses or a mask—which can give rise to a situation of discomfort while not being very practical to implement.

Another problem lies in the fact that those techniques also require two images to be taken of the same scene, preferably simultaneously, and at different angles. This implies having special equipment available for taking photographic images, which equipment is expensive, and makes it practically impossible to view works such as drawings or paintings in three dimensions since the artist would need to reproduce the same scene from two different angles without omitting the slightest detail.

The object of the present invention is thus to enable an image to be viewed directly in three dimensions without additional viewing means, and to provide a method that is easy to implement and suitable for application to drawings, to paintings, and to projected images (such as for example still images of the slide type, or moving images of the cinema film type).

To this end, the invention provides a direct viewing method and a device for implementing the method that enable a three-dimensional effect to be obtained by optical offsetting based on varied superpositions of image portions.

More precisely, the invention provides a method of viewing an image directly in three dimensions, the method comprising the steps consisting in cutting at least two strips from at least one structured panel; and fastening the strips on a backing panel so that at least a portion of a structured panel strip is at a determined distance from the panel on which it is fastened; and viewing the image on the panels.

In particular embodiments:

the image is viewed by being represented on the backing and structured panels; and the image is viewed by being projected onto the backing and structured panels.

The invention also provides a viewing board for viewing images directly in three dimensions, comprising a backing panel and at least one structured panel provided with at least one cut defining at least two strips the strips, being fastened on the backing panel by fastener means so that at least one strip portion of the structured panel is at a determined distance from the panel on which it is fastened.

In particular embodiments:

the fastener means may be adjustable;

the structured panels may be made of a material that is sufficiently flexible to enable the strips to be curved;

the structured panels may be prestressed and shaped so that the strips present predetermined curvature;

at least one structured panel may be cut to form strips that are independent from one another;

at least one structured panel may be cut to form strips that are secured to a common base;

the panels may be of different shapes and/or dimensions;

the strips of a given structured panel may be of different shapes and/or dimensions;

the strips may be disposed vertically under standard viewing conditions;

at least two structured panels may be fastened in adjacent manner and superposed on the backing panel;

all of the structured panels may be fastened in mutually superposed manner;

the board may have structured panels fastened in adjacent manner, and structured panels fastened in superposed manner; and the backing panel may be made of translucent material and the structured panel(s) may present a layer of translucent material and a layer of opaque material facing the backing panel.

Other characteristics of the invention are set out in the following detailed description made with reference to the accompanying figures given by way of non-limiting example, and in which:

FIG. 1 is a perspective view of an embodiment of a display device of the invention in which the strips are held in position by fastener means;

FIG. 2 is a perspective view of another embodiment of the display device of the invention with prestressed strips;

FIG. 3 is a section view showing one example of how the strips present in the FIG. 1 device may be shaped;

Figure 4:
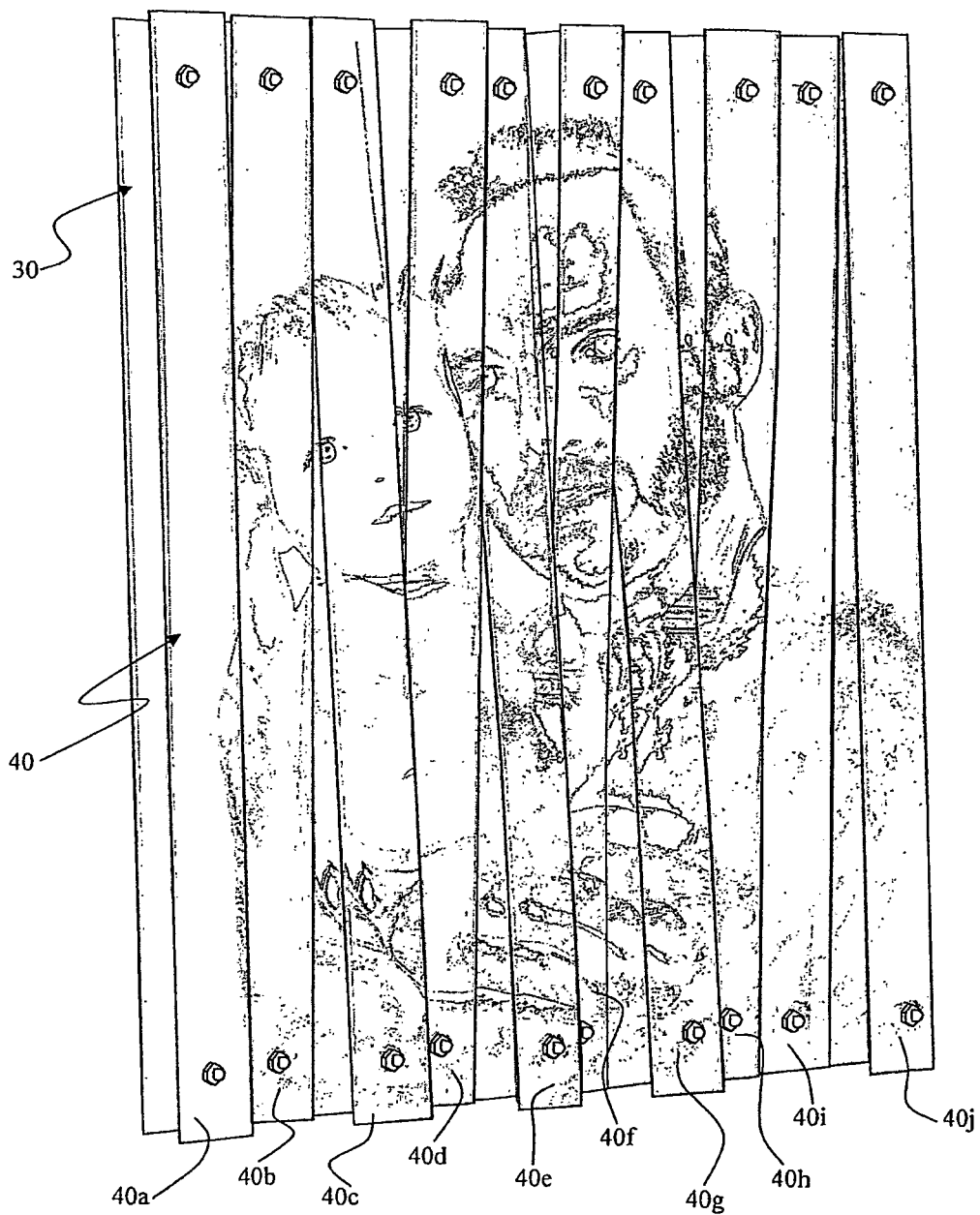
FIG. 4 is a perspective view of an example of a representation in three dimensions.

The embodiment shown in FIG. 1 of a display device of the invention comprises a backing panel 1 and two structured panels 2 and 3.

Each structured panel 2, 3 is cut out so as to define a plurality of strips 2a, 2b, 2c, 2e, 2f, 3a, 3b that, in this embodiment, are independent of one another within a given structured panel 2, 3. In other words, the fastening of a strip 2a on the backing panel 1 is independent of the fastening of the strip 2b thereon. Similarly, the fastening of the strip 3b on the strip 2b is independent of the fastening of the strip 3d on the strip 2d.

The structured panels 2, 3 are thus fastened on the backing panel 1 by mechanical fastening means 5. To give the effect of relief, the structured panels 2, 3 are arranged so that at least one strip of one structured panel is held at a determined distance from the panel on which it is fastened. Thus, the end of the strip 2a that is situated towards the bottom of FIG. 1 is held at a zero distance from the backing panel on which it is fastened, whereas the end of the strip 2a that is situated towards the top of FIG. 1 is held at a distance d from the panel 1. Other configurations are possible: for example the strip 2c presents a configuration that is the opposite of that of the strip 2a; the strip 2b presents substantially the same configuration as the strip 2c, but it is also covered by a strip 3b, with a section view of this structure being shown in FIG. 3; two adjacent strips 2e and 2f may be held at different distances d1 and d2 from the panel 1 so as to give a particular relief effect; more simply, a strip 2g may be held at a distance from the backing panel 1 that is not zero, and that is not necessarily constant.

The configuration of the set of strips shown in FIG. 1 is given purely by way of example so as to illustrate various possible shapes for the strips. The device of the invention is adaptable as a function of the image shown and it allows for a multitude of individual shapes for the strips, and also for a multitude of shapes for the set of strips.

In order to make the device of the invention easier to implement, the mechanical fastener means 5 that are used firstly to fasten the panels to one another and secondly to hold the strips in the selected shape, i.e. at a determined distance, are fastener means that are adjustable. In the embodiment shown, they are constituted by bolts 6 and nuts 7 screwed onto the bolts 6 at appropriate distances so as to obtain the desired three-dimensional effect as a function of the shapes of the strips.

Furthermore, the structured panels may be made of a material that is sufficiently flexible to enable the strips to be curved, with the determined distance between the strip and the panel on which it is fastened then possibly varying. A rigid material could also be used, but the strips of the panel need to be arranged so as to enable them to be fastened at an angle relative to the backing panel and/or to another structured panel, which angle is adapted to the desired relief effect.

As shown in FIG. 2, the material used may also be selected so as to enable it to be prestressed and shaped in such a manner that the strips present curvature and are fastened at one end only. The determined distance between a strip and the panel on which it is fastened then varies. Naturally, the embodiments of FIGS. 1 and 3 may be combined, in particular in such a manner as to reduce the number of fastener and distance-maintaining means.

FIG. 4 shows an example of an illustration covering a backing panel 30 with an identical copy covering a structured panel 40. The structured panel is cut up so as to determine ten mutually independent strips 40a to 40j.

In this embodiment, the backing panel and the structured panel are constituted by a rectangular aluminum medium covered by a medium representing the same image, a layer of silicone, and a transparent plate of polymethyl methacrylate (PMMA). The layer of silicone serves not only to bond the PMMA plate adhesively on the image medium during a compression step, but also reinforces the impression of relief and depth in the image. Thereafter, the structured panel is cut up into mutually independent rectangular strips using conventional methods known to the person skilled in the art. These strips are then fastened on the backing panel by adjustable fastener means.

Finally, the heights of the strip portions are adjusted so that at least one strip portion of the structured panel is at a determined distance from the panel on which it is fastened in such a manner as to obtain the three-dimensional effect.

The shape of each strip, and also the overall shape, give a three-dimensional viewing effect that emphasizes certain elements of the image and give a volume effect.

To improve the impression of relief, each panel, whether the backing panel or a structured panel, an be covered in respective image media having mutually offset viewing angles.

Figure 5:
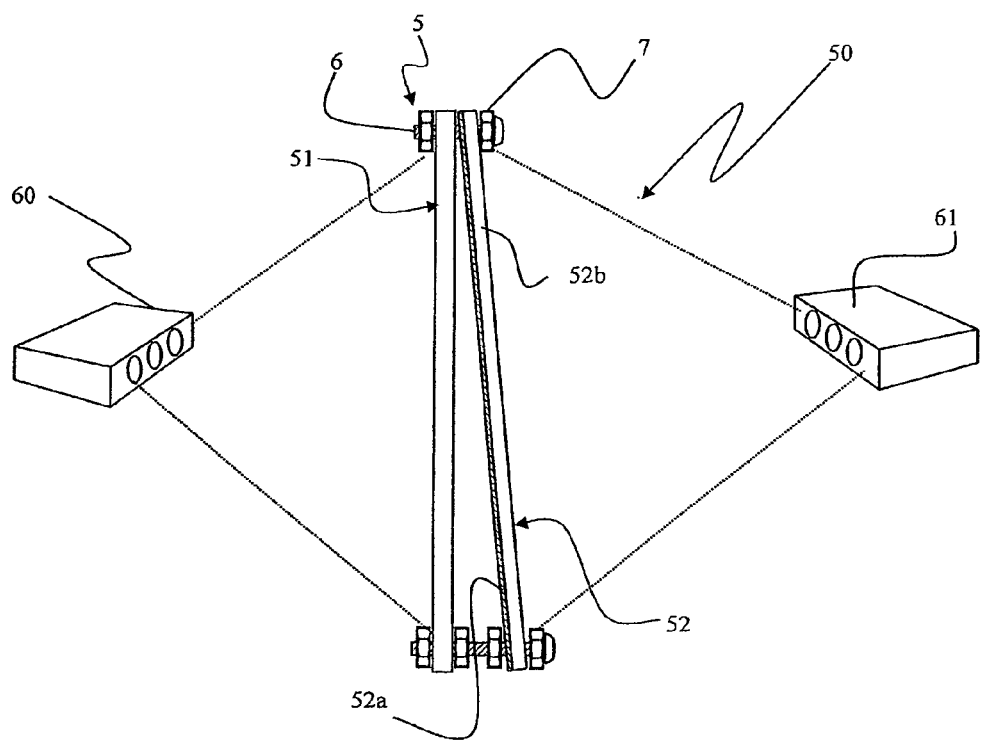
FIG. 5 is an isometric view of another embodiment of a display device of the invention in which images are projected onto the board.

Another embodiment of the invention is shown in FIG. 5. The device shown in this figure enables an image to be projected onto a medium 50 of the invention. Thus, unlike the embodiment shown in FIGS. 1 to 4, the images are not physically represented or constituted on the backing panel 51 or the structured panel 52, but they are projected thereon by facing projectors 60 and 61.

For this purpose, the backing panel 51 is made of a translucent material so as to enable the image projected by the projector 60 to be formed on the free face of the backing panel 51 that faces the projector 60, so as to be observable in "opaque white" by a person situated on the same side as the projector 61.

A structured panel made up of strips 52 is fastened on the backing panel 51. Each of the strips is constituted by a layer of opaque material 52a and a layer of translucent material 52b. The translucent layer 52b makes it possible to form an image projected by the projector 61 onto the structured panel 52, and the opaque layer 52a prevents the light coming from the projectors 60 and 61 from interfering.

Thus, an observer placed beside the projector 61 sees on the strips of the structured panel 52 the image projected by the projector 61, and sees on the backing panel 51 the image projected by the projector 60.

Such an embodiment makes it possible to reuse the same backing and structured panels with different series of images. It is thus possible regularly to renew the images that are projected without it being necessary to fabricate a new board. Optionally, it can then suffice to modify the arrangement of the strips (by modifying the distances at which the strips are fastened relative to the backing panel) as a function of the structure of the new image.

Such an embodiment can also be used to find the best possible configuration for the strips for a given image, e.g. prior to fabricating a panel for the embodiments described with reference to FIG. 2.

According to other characteristics of the invention:
- a structured panel may be cut up in such a manner as to form strips that are secured to a common base, like a comb. Under such circumstances, only the free ends of the strips can be shifted independently of one another to give a three-dimensional effect to the image shown on the board of the invention;
- each adjustable fastener means may comprise both a rigid rod provided with a rack, and elastically retractable clips that are fastened to the strips. Thus, a strip can be moved along the rack and blocked at a determined distance from the panel on which it is fastened by making the clip co-operate with the rack;
- the board may be made up of panels of different dimensions. Thus, by way of example, in FIG. 1 the structured panel 3 comprises only two strips 3b and 3d, while the structured panel 2 comprises 15 strips;

the structure of the device of the invention may be adapted to the image being shown and/or to the desired volume effect. Thus, the strips of a given structured panel may be of different dimensions, for example they may be of different lengths and/or widths if they are constituted by structures that are rectangular. Furthermore, the structured panels may be fastened in adjacent manner and superposed on the backing panel. Naturally, it is possible to combine these embodiments so that the display device comprises structured panels that are fastened in adjacent manner, and structured panels that are fastened in superposed manner;

the strips may be fastened at both ends to the backing panel, such that only the portion between said two ends is not in contact with the backing panel, but is held at a determined distance therefrom;

the strips may present a plurality of curvatures formed successively by implementing intermediate fastener means, the ends of the strips possibly being connected to the panel on which they are fastened or left free so as to be at the distance determined by the fastener means;

the shape of the backing panel and/or of the strips of the structured panel(s) is/are preferably rectangular, but could also be ring-shaped, egg-shaped, truncated, cylindrical, or combinations of shapes left to the appreciation of the artist;

a strip may be constituted by a plurality of independent sub-strips;

the material used for the structured panels may be plastically deformable;

the fastener means may be chemical (permanent or reusable adhesive, welding), magnetic means, etc.;

the backing panel may be a wall or any other support surface (made of wood, concrete, brick, translucent material, etc.) on which the strips of one or more structured panels are fastened;

the strips of the structured panel(s) may be spaced apart laterally to a greater or lesser extent to uncover more or less of the image on the backing panel; it is possible for the strips to overlap sideways a little;

the images on the backing panel and on the structured panel(s) may be respectively identical, offset, of different colors, and/or complementary; and the panels may comprise flat display screens of the liquid crystal, plasma, or any equivalent technology type.

The invention claimed is:

1. A method of displaying images directing in three dimensions, the method being characterized in that it comprises the steps consisting of:
   a) cutting at least two strips from at least one structured panel to form structured panel strips;
   b) independently fastening the structured panel strips on a backing panel so that at least a portion of at least one of the structured panel strips is at a determined distance from the backing panel, the determined distance between said portion of said at least one structured panel strip and the backing panel on which the at least one structured panel strip is fastened being variable along a length of at least one structured panel strip portion to obtain an effect of relief, wherein the at least one structured panel strip is shaped with a predetermined curvature; and
   c) displaying the image on the structured panel strip so that an observer located in front of the at least one structured panel can see a displayed three dimensional image on the at least one structured panel.

2. A method of displaying directly in three dimensions according to claim 1, wherein the image being displayed is represented on the backing and structured panels.

3. A method of displaying directly in three dimensions according to claim 1, wherein the image being displayed is projected onto the backing and structured panels.

4. A board for displaying images directly in three dimensions comprising a back panel and at least one structured panel provided with at least one cut defining at least two strips, the at least two strips being attached above the back panel by fixing means so that at least a portion of at least one of the strips of the structured panel is at a given distance from the back panel to which it is attached, the distance between the at least one strip portion and the back panel on which the strip is attached being variable for said at least one strip portion along the length of said at least one strip portion, wherein at least the one strip portion is shaped with a predetermined curvature to obtain a three dimensional effect.

5. The board according to claim 4, wherein the fixing means are adjustable.

6. The board according to claim 4, wherein the structured panels are made of a material that is sufficiently flexible to have said curvature.

7. The board according to claim 4, wherein the at least one structured panel is prestressed.

8. The board according to claim 4, wherein the at least one structured panel is cut to form strips that are independent from one another.

9. The board according to claim 4, wherein the at least one structured panel is cut to form strips that are secured to a common base.

10. The board according to claim 4, wherein the panels have one or more of different shapes and different dimensions.

11. The board according to claim 4, wherein the strips of a given structured panel have one or more of different shapes and different dimensions.

12. The board according to claim 4, wherein the strips are disposed vertically under standard viewing conditions.

13. The board according to claim 4, wherein at least two of the structured panels are fastened in adjacent manner and superposed on the backing panel.

14. The board according to claim 4, wherein all of the structured panels (2, 3) are fastened in mutually superposed manner.

15. The board according to claim 4, comprising structured panels fastened in adjacent manner, and structured panels fastened in superposed manner.

16. The board according to claim 4, wherein the back panel is made of translucent material and the structured panel(s) present(s) a layer of translucent material and a layer of opaque material facing the backing panel.

* * * * *